United States Patent
Okada et al.

(10) Patent No.: US 10,949,686 B2
(45) Date of Patent: Mar. 16, 2021

(54) IMAGE PROCESSING DEVICE AND IMAGE PROCESSING METHOD

(71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

(*) Notice: Subject to any disclaimer, the term of this patent is extended or adjusted under 35 U.S.C. 154(b) by 0 days.

(21) Appl. No.: 16/574,598

(22) Filed: Sep. 18, 2019

(65) Prior Publication Data
US 2020/0193193 A1 Jun. 18, 2020

(30) Foreign Application Priority Data
Dec. 14, 2018 (JP) .............................. JP2018-234799

(51) Int. Cl.
*G06K 9/00* (2006.01)
*G06K 9/46* (2006.01)
*G06K 9/32* (2006.01)

(52) U.S. Cl.
CPC ....... *G06K 9/00812* (2013.01); *G06K 9/3233* (2013.01); *G06K 9/4628* (2013.01); *G06K 9/4676* (2013.01)

(58) Field of Classification Search
None
See application file for complete search history.

(56) References Cited

U.S. PATENT DOCUMENTS

| 9,361,529 B2 | 6/2016 | Ryu et al. |
| 9,536,155 B2 | 1/2017 | Takemae |
| 9,721,460 B2 | 8/2017 | Takemura et al. |

(Continued)

FOREIGN PATENT DOCUMENTS

| CN | 203318408 U | 12/2013 |
| CN | 102834309 B | 12/2016 |

(Continued)

OTHER PUBLICATIONS

U.S. Appl. No. 16/574,395, filed Sep. 18, 2019 in the name of Yasutaka Okada et al.

(Continued)

*Primary Examiner* — Fernando Alcon
(74) *Attorney, Agent, or Firm* — Oliff PLC

(57) ABSTRACT

An image processing device includes: an extraction unit which extracts a horizontal edge line in which edge points are arranged consecutively in a horizontal direction from an image taken that contains an image of a parking frame; a detection unit which detects, in a case where an edge length of a series edge line in which a plurality of the horizontal edge lines are arranged in the horizontal direction like a broken line is longer than or equal to a prescribed threshold value among a plurality of the horizontal edge lines extracted by the extraction unit, the series edge line as corresponding to a deep-side boundary line of a parking frame; and a determining unit which determines a stop position in the parking frame based on the boundary line detected by the detection unit.

5 Claims, 14 Drawing Sheets

(56) References Cited

U.S. PATENT DOCUMENTS

| | | |
|---|---|---|
| 10,311,731 B1 | 6/2019 | Li et al. |
| 10,373,226 B1 | 8/2019 | Russell et al. |
| 2002/0087253 A1 | 7/2002 | Jeon |
| 2003/0222983 A1 | 12/2003 | Nobori et al. |
| 2004/0254720 A1 | 12/2004 | Tanaka et al. |
| 2006/0080035 A1 | 4/2006 | Daubert et al. |
| 2009/0243889 A1 | 10/2009 | Suhr et al. |
| 2010/0195901 A1 | 8/2010 | Andrus et al. |
| 2013/0027557 A1 | 1/2013 | Hirai et al. |
| 2014/0355822 A1 | 12/2014 | Choi et al. |
| 2015/0294163 A1* | 10/2015 | Sakamoto ............... G06T 7/136 382/103 |
| 2015/0344028 A1* | 12/2015 | Gieseke ............... B62D 15/028 701/1 |
| 2016/0039409 A1* | 2/2016 | Hayakawa ............ B60W 50/12 701/70 |
| 2016/0093214 A1 | 3/2016 | Wu et al. |
| 2016/0272244 A1* | 9/2016 | Imai ....................... G08G 1/166 |
| 2016/0304088 A1 | 10/2016 | Barth |
| 2018/0095474 A1 | 4/2018 | Batur et al. |
| 2018/0099661 A1 | 4/2018 | Bae et al. |
| 2018/0215413 A1* | 8/2018 | Inagaki ..................... G01S 7/56 |
| 2018/0307919 A1* | 10/2018 | Hayakawa ......... G06K 9/00798 |
| 2018/0307922 A1 | 10/2018 | Yoon et al. |
| 2019/0073902 A1* | 3/2019 | Indoh ..................... G08G 1/143 |
| 2019/0370572 A1 | 12/2019 | Nagpal et al. |
| 2020/0062242 A1 | 2/2020 | Hayakawa |
| 2020/0104613 A1 | 4/2020 | Hirai |
| 2020/0193643 A1 | 6/2020 | Hess et al. |

FOREIGN PATENT DOCUMENTS

| | | |
|---|---|---|
| JP | 2003-032669 A | 1/2003 |
| JP | 2005-300294 A | 10/2005 |
| JP | 2009-288867 A | 12/2009 |
| JP | 2012-176641 A | 9/2012 |
| JP | 2012-221375 A | 11/2012 |
| JP | 2013-001366 A | 1/2013 |
| JP | 2014-106731 A | 6/2014 |
| JP | 2014-146182 A | 8/2014 |
| JP | 2015-104982 A | 6/2015 |
| JP | 2015-185138 A | 10/2015 |
| JP | 2015219774 A | 12/2015 |
| JP | 2017-021747 A | 1/2017 |
| JP | 2017-076275 A | 4/2017 |
| JP | 2017-087758 A | 5/2017 |
| JP | 2018-136695 A | 8/2018 |
| JP | 2018-180941 A | 11/2018 |
| KR | 20170102192 A | 9/2017 |
| WO | 03058163 A1 | 7/2003 |
| WO | 2005081941 A2 | 9/2005 |
| WO | 2010116922 A1 | 10/2010 |
| WO | 2014/084118 A1 | 6/2014 |
| WO | WO-2017068699 A1 * | 4/2017 ............... G06T 7/12 |

OTHER PUBLICATIONS

U.S. Appl. No. 16/574,507, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
U.S. Appl. No. 16/574,516, filed Sep. 18, 2019 in the name of Yasutaka Okada et al.
Jun. 30, 2020 Notice of Allowance Issued in U.S. Appl. No. 16/574,546.
Sep. 29, 2020 Office Action issued in U.S. Appl. No. 16/574,391.
Nov. 23, 2020 Office Action issued in U.S. Appl. No. 16/574,462.
K Choeychuen, "Available car parking space detection from webcam by using adaptive mixing features," 2012 Ninth International Joint Conference on Computer Science and Software Engineering (JCSSE) (Year: 2012).
Nov. 30, 2020 Office Action issued in U.S. Appl. No. 16/574,503.
Suhr et al., "Automatic Parking Space Detection and Tracking for Underground and Indoor Environments." IEEE Transactions on Industrial Electronics. (Year: 2016).
K Hamada et al., "Surround View Based Parking Lot Detection and Tracking. " IEEE Intelligent Vehicles Symposium. (Year 2015) pp. 1106-1111.
Dec. 3, 2020 Office Action issued in U.S. Appl. No. 16/574,393.
J Suhr et al., "A Universal Vacant Parking Slot Recognition System Using Sensors Mounted on Off-the-Shelf Vehicles." (Year 2018).
Reinhard et al., Photographic Tone Reproduction for Digital Images (2002), ACM Transactions on Graphics, 2, 4, 217-236 (Year: 2002).
Feb. 2, 2021 Office Action issued in U.S. Appl. No. 16/574,422.

* cited by examiner

FIG. 9
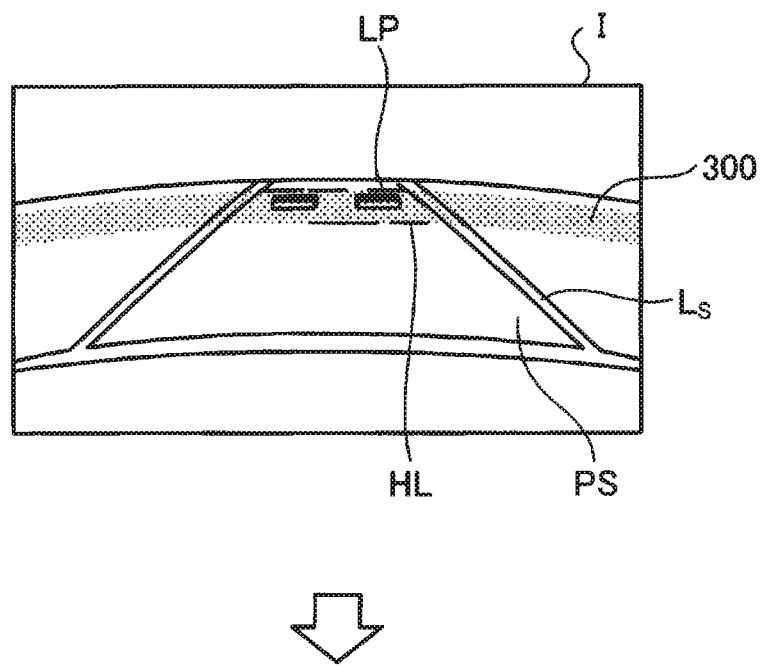
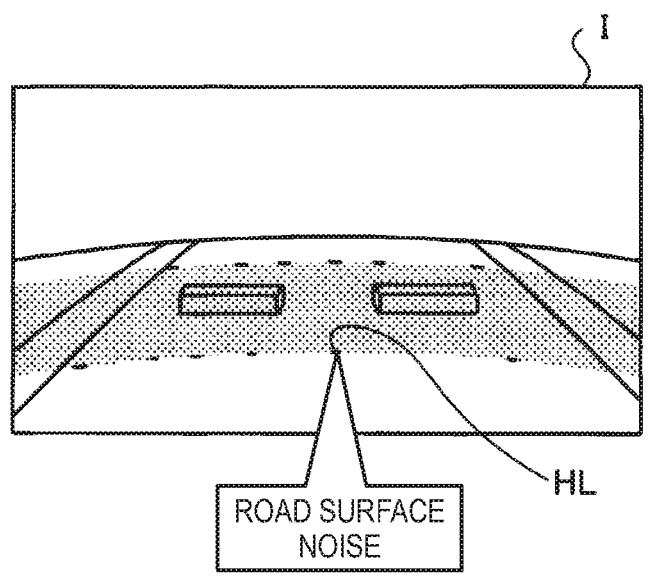
ROAD SURFACE NOISE

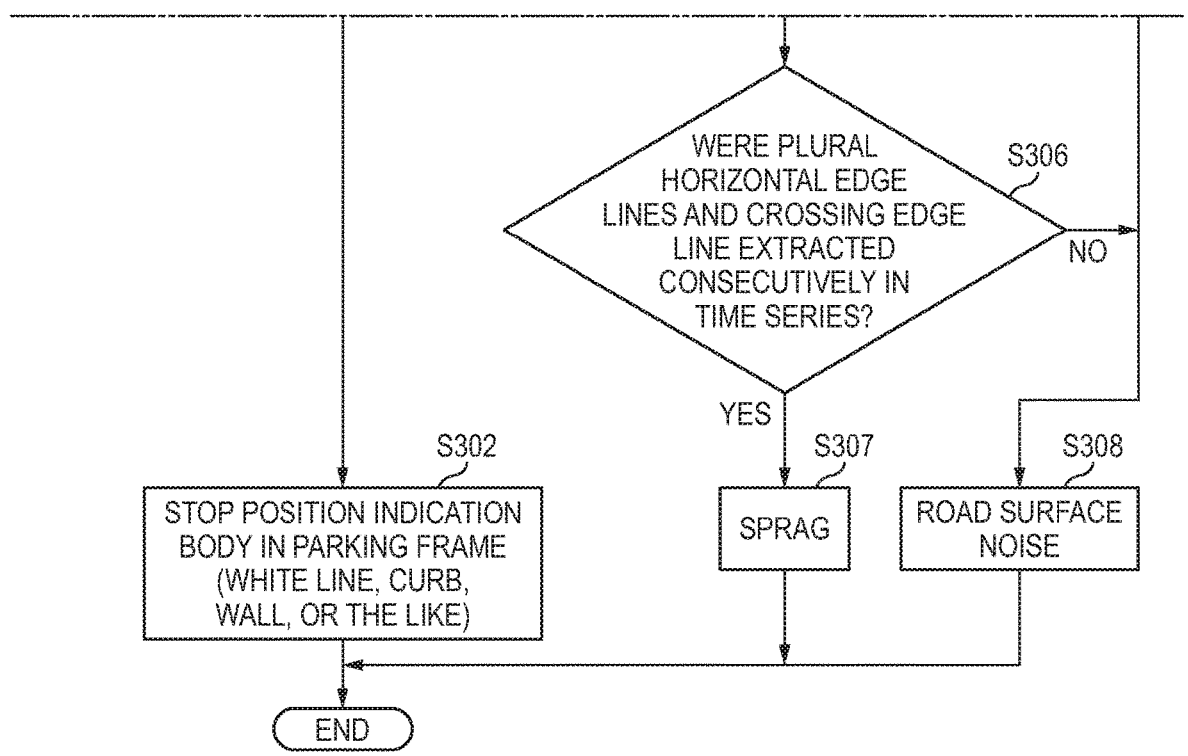

IMAGE PROCESSING DEVICE AND IMAGE PROCESSING METHOD

CROSS-REFERENCE TO RELATED APPLICATIONS

This application is based on and claims priority under 35 USC 119 from Japanese Patent Application No. 2018-234799 filed on Dec. 14, 2018.

TECHNICAL FIELD

The present invention relates to an image processing device and an image processing method.

BACKGROUND ART

In recent years, with the development of autonomous drive techniques, image processing devices for detecting a parking frame in which to park a vehicle on the basis of an image taken by shooting a neighborhood of the vehicle have been coming into wide use. Image processing devices of this type detect partition lines of a parking frame on the basis of an image taken and detect the parking frame on the basis of the detected partition lines (refer to JP-A-2017-87758, for example).

Furthermore, image processing devices detect, for example, a three-dimensional indication body such as a curb or a sprag(s) and determine a stop position in the parking frame on the basis of the detected three-dimensional indication body.

SUMMARY OF INVENTION

However, the conventional techniques have room for improvement in how to determine a proper stop position. More specifically, if, for example, fallen leaves or the like are laid along the bottom end line of a curb or a sprag, trouble may occur that the bottom end line of such a three-dimensional indication body cannot be detected to cause an error in measuring a distance to the three-dimensional indication body.

The present invention has been made in view of the above, and an object of the invention is therefore to provide an image processing device and an image processing method capable of determining a proper stop position.

The image processing device according to the embodiment is equipped with an extraction unit, a detection unit, and a determining unit. The extraction unit extracts a horizontal edge line in which edge points are arranged consecutively in the horizontal direction from an image taken that contains an image of a parking frame. The detection unit detects the series edge line as corresponding to a deep-side boundary line of the parking frame if an edge length of a series edge line in which plural horizontal edge lines are arranged in the horizontal direction like a broken line is longer than or equal to a prescribed threshold value among plural horizontal edge lines extracted by the extraction unit. The determining unit determines a stop position in the parking frame on the basis of the boundary line detected by the detection unit.

The invention makes it possible to determine a proper stop position.

BRIEF DESCRIPTION OF DRAWINGS

FIG. 9 illustrates sprag detection processing that utilizes temporal continuity.

DETAILED DESCRIPTION OF THE INVENTION

An image processing device 1 and an image processing method according to an embodiment will be hereinafter described in detail with reference to the accompanying drawings. The present invention is not limited by the embodiment.

First, the image processing method according to the embodiment will be outlined with reference to FIGS. 1A-1D. FIGS. 1A-1D outline the image processing method according to the embodiment. How the image processing device 1 according to the embodiment determines a stop position in a parking frame by performing the image processing method according to the embodiment will be described with reference to FIGS. 1A-1D.

Figure 1A:
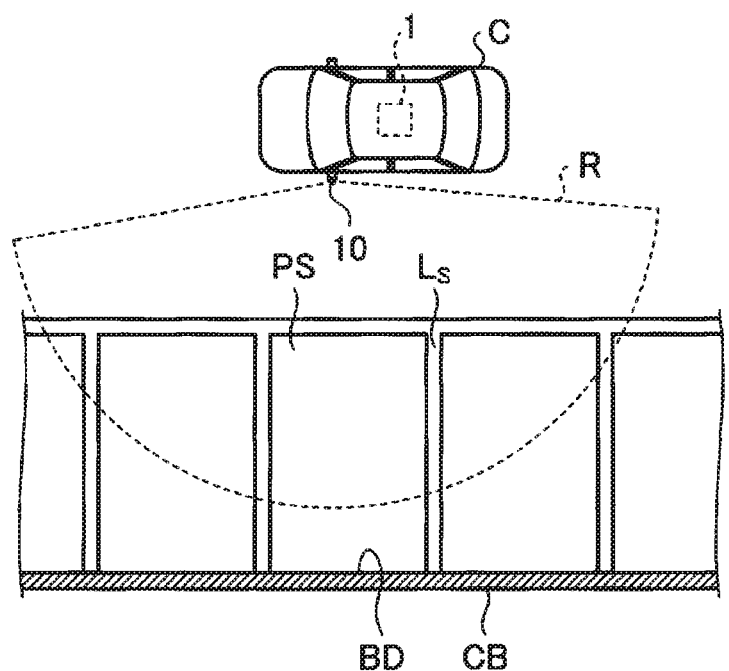
FIG. 1A is a first drawing that outlines an image processing method according to an embodiment.

As shown in FIG. 1A, the image processing device 1 is incorporated in a vehicle C and performs the image processing method according to the embodiment. More specifically, first, the image processing device 1 detects a parking frame PS on the basis of an image taken by a vehicular camera 10. Each parking frame PS is a region in which to park a vehicle and that is formed by partition lines Ls.

In the example shown in FIG. 1, each parking frame PS is surrounded from the four sides by two partition lines Ls that extend alongside the side surfaces of the vehicle C and serve for partitioning in the vehicle width direction (in the case where the vehicle C is parked), a partition line Ls that extends in the vehicle width direction and serves for partitioning in the vehicle longitudinal direction on the front side, and a curb CB that extends in the vehicle width direction and serves for partitioning in the vehicle longitudinal direction on the deep side. Alternatively, the parking frame PS may be a U-shaped one that does not have a front-side partition line Ls extending in the vehicle width direction and has a curb CB and two partition lines Ls extending in the vehicle longitudinal direction. The curb CB is an example three-dimensional indication body that is a parking position indication body, and may be replaced by a wall, a sprag(s) LP (see FIG. 1D), or the like. The parking position indication body may be a partitioning line Ls such as a white line. In the following, the white line and the three-dimensional indication body will be referred to together as a "three-dimensional indication body."

Equipped with an imaging device such as a CCD (charge-coupled device) or a CMOS (complementary metal-oxide-semiconductor) sensor, each vehicular camera 10 shoots a neighborhood of the vehicle C. The lens system of each vehicular camera 10 employs a wide-angle lens such as a fisheye lens and has an imaging range R as shown in FIG. 1A.

Although in the example of FIG. 1A the vehicular camera 10 is a left side camera for shooting a left side area around the vehicle C, plural vehicular cameras 10 are installed which include a front camera for shooting an area in front of the vehicle C, a rear camera for shooting an area in the rear of the vehicle C, and a right side camera for shooting a right side area around the vehicle C.

The image processing device 1 detects the bottom end line of a deep-side boundary line BD (i.e., a curb or the like) of a parking frame PS from an image taken by a vehicular camera 10 and determines a stop position on the basis of the position of the three-dimensional indication body. For example, the curb CB is detected on the basis of horizontal edge lines in each of which edge points are arranged consecutively in the horizontal direction (vehicle width direction) among edge points obtained from the image taken. The deep-side boundary line BD may be the boundary of a white line, a wall boundary, or the like instead of the bottom end line of the curb CB.

Figure 1B:
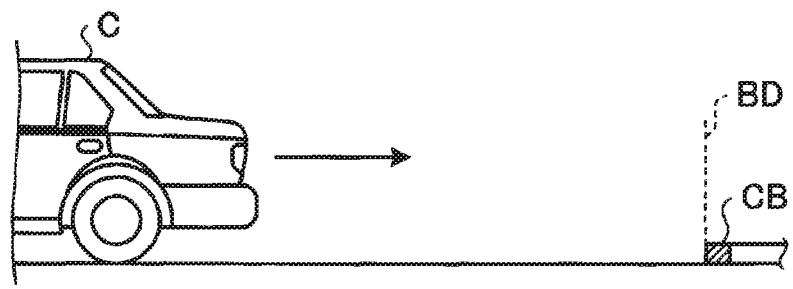
FIG. 1B is a second drawing that outlines the image processing method according to the embodiment.

As shown in FIG. 1B, for example, where the three-dimensional indication body is a curb CB, the image processing device 1 determines a stop position so that the rear end of the vehicle C is located at the position of a boundary line BD that corresponds to the bottom end line of the curb CB.

Incidentally, conventional techniques have room for improvement in how to determine a proper stop position. More specifically, if, for example, obstructive objects such as fallen leaves are laid along the bottom end line of the curb CB, trouble may occur that a horizontal edge line corresponding to the bottom end line of the curb CB is divided into a line like a broken line, as a result of which the bottom end line of the curb CB cannot be detected to cause an error in measuring a distance to the curb CB. For example, if the bottom end line of the curb CB cannot be detected, ranging may be performed in such a manner that a horizontal edge line corresponding to a top end line of the curb CB is regarded as that corresponding to a bottom end line, resulting in trouble that a stop position is determined to be a position that is on the deep side of the true position of the curb CB.

In view of the above, in the image processing method according to the embodiment, ranging is performed in such a manner that a horizontal edge line is divided into a line like a broken line by obstructive objects such as fallen leaves, the broken-line-like horizontal edge line is detected as a boundary line BD. A specific example of the image processing method according to the embodiment will be described below with reference to FIG. 1C.

Figure 1C:
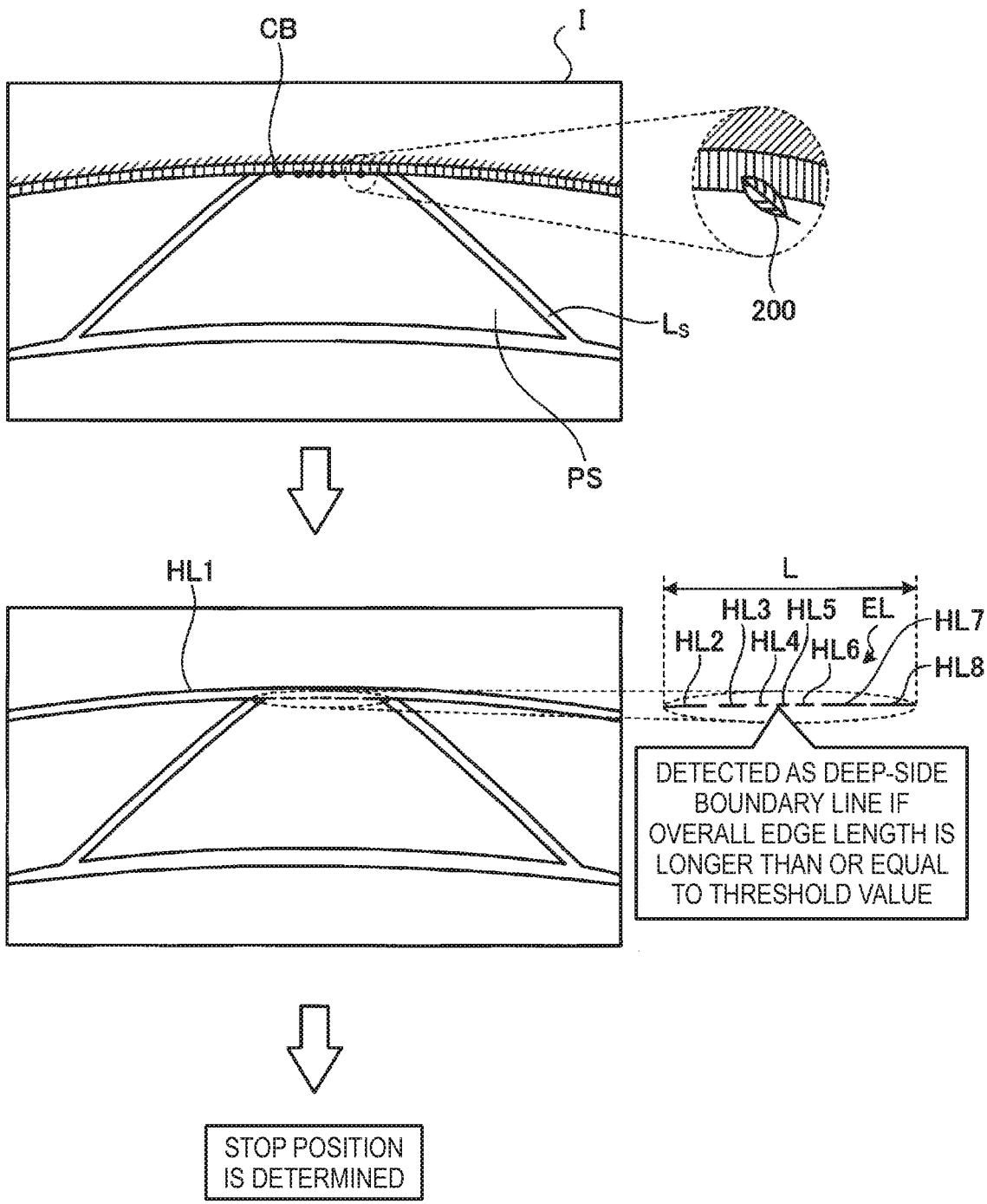
FIG. 1C is a third drawing that outlines the image processing method according to the embodiment.

As shown in the top part of FIG. 1C, first, the image processing device 1 acquires an image I taken that contains images of a parking frame PS and a curb CB. It is assumed that the image I reflects a state that obstructive objects 200 such as fallen leaves are laid along the bottom end line of the curb CB.

Then, as shown in the middle part of FIG. 1C, the image processing device 1 performs edge extraction processing on the image I and extracts, from the image I, horizontal edge lines HL1-HL8 in each of which edge points are arranged consecutively in the horizontal direction. As shown in the middle part of FIG. 1C, among the plural extracted horizontal edge lines HL1-HL8, the plural horizontal edge lines HL2-HL8 which should be extracted as a single horizontal edge line are divisional lines like a broken line because of the presence of the obstructive objects 200.

In this case, if the overall edge length of the series of plural horizontal edge lines HL2-HL8 arranged in the horizontal direction like a broken line (hereinafter referred to as a "series edge line EL") is longer than or equal to a prescribed threshold value, the image processing device 1 detects the series edge line EL as a deep-side boundary line BD of the parking frame PS and determines a stop position on the basis of the detected boundary line BD.

That is, the image processing method according to the embodiment detects the boundary line BD that is the bottom end line of the curb CB paying attention to the characteristic that short horizontal edge lines HL2-HL8 like a broken line are formed when the boundary line BD is divided by obstructive objects 200. In other words, the image processing method according to the embodiment detects the boundary line BD regarding, as a single horizontal edge line, the broken-line-like series edge line EL whose overall edge length is longer than or equal to the prescribed threshold value.

As a result, since the boundary line BD that is the bottom end line of the curb CB can be detected with high accuracy, trouble can be avoided that a stop position is determined erroneously and the vehicle C goes up onto the curb CB. As such, the image processing method according to the embodiment can determine a proper stop position.

The image processing device 1 can presume and narrow down a region where a series edge line EL corresponding to the bottom end line of the curb CB exists by detecting a single series edge line EL1 corresponding to a top end line of the curb CB. This feature will be described later with reference to FIG. 4.

Even where an image I taken does not reflect a top end line of a three-dimensional indication body (wall) as in the case of, for example, a relatively tall wall, the image processing device 1 can easily detect the boundary line BD between the wall and the parking frame PS by detecting only a series edge line EL as a bottom end line of the wall.

A three-dimensional indication body such as a sprag LP whose length in the horizontal direction is shorter than a curb CB etc. can be detected using crossing edge lines VL that crosses the horizontal direction I addition to a horizontal edge line. This feature will be described below with reference to FIG. 1D.

Figure 1D:
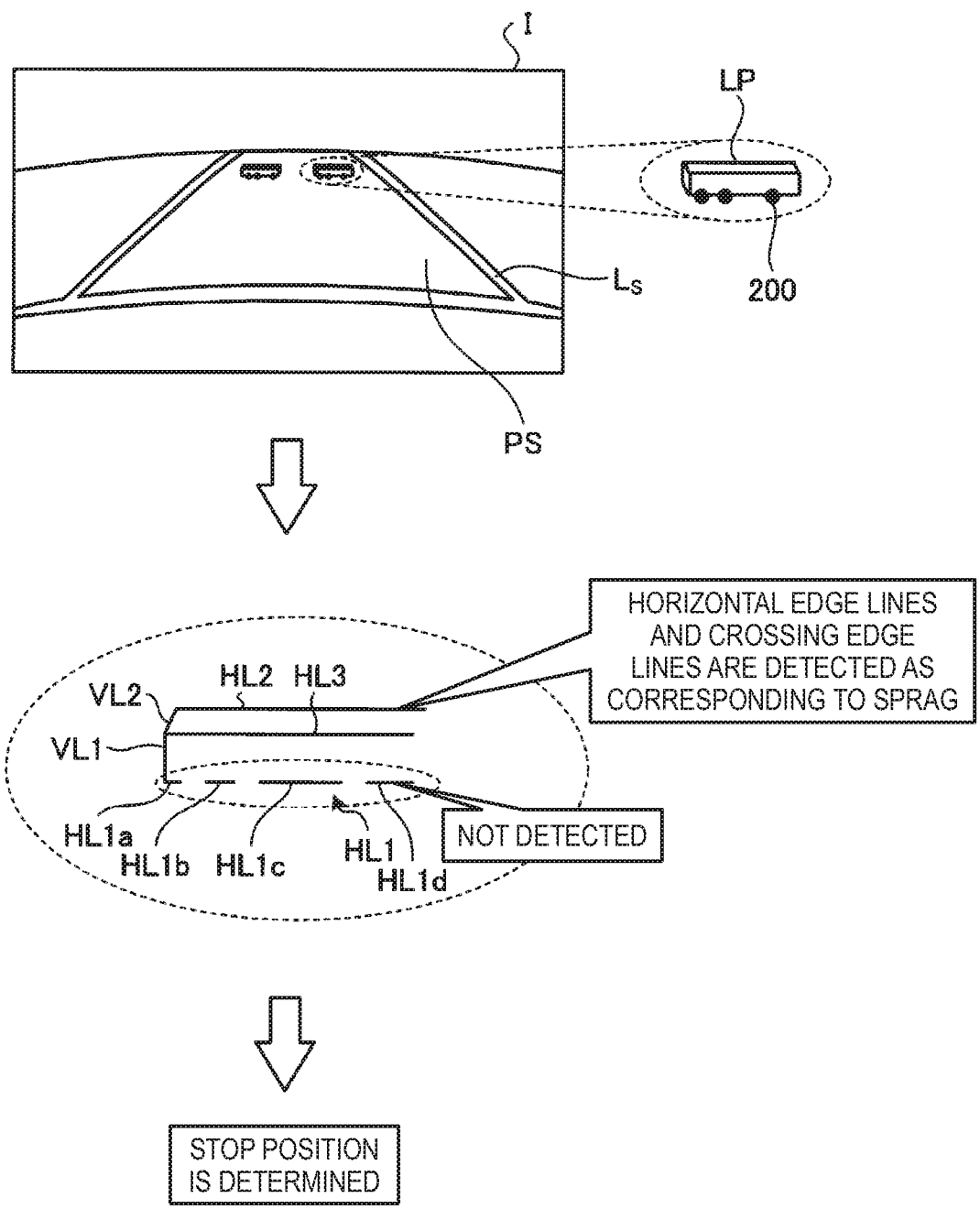
FIG. 1D is a fourth drawing that outlines the image processing method according to the embodiment.

The top part of FIG. 1D shows an image I taken that contains images of a parking frame PS and sprags LP. It is assumed that obstructive objects 200 are laid along the bottom end lines of the sprags LP.

First, by performing edge extraction processing on the image I taken, the image processing device 1 extracts, from the image I, horizontal edge lines HL1-HL3 and crossing edge lines VL1 and VL2 in each of which edge points are arranged consecutively in a direction that crosses the horizontal direction. It is assumed that because of the presence of the obstructive objects 200 the horizontal edge line HL1 is divided into horizontal edge lines HL1a-HL1d which are like a broken like and hence is not detected as corresponding to a bottom end line of the sprag LP.

In this case, conventionally, the sprag LP is detected on the basis of the horizontal edge lines other than the broken-line-like horizontal edge line HL1, that is, the continuous horizontal edge lines HL2 and HL3 (see FIG. 1D). However, if, for example, the continuous horizontal edge lines HL2 and HL3 are too short or long to be a proper horizontal edge line HL or a horizontal edge line irrelevant to the sprag LP is detected as corresponding to the sprag LP because of road surface noise or the like, trouble may occur that, for example, the sprag LP cannot be detected or its position is detected erroneously.

In view of the above, the image processing device 1 detects the sprag LP taking the crossing edge lines VL1 and VL2 into consideration.

More specifically, the image processing device 1 detects the horizontal edge lines HL2 and HL3 and the crossing edge lines VL1 and VL2 as corresponding to the sprag LP if they satisfy prescribed detection conditions. The image processing device 1 determines a stop position on the basis of the detected sprag LP.

The above-mentioned prescribed detection conditions include conditions relating to the arrangement of the horizontal edge lines HL2 and HL3 and the crossing edge lines VL1 and VL2, their crossing angles, etc. The details of the detection conditions will be described later.

That is, in the image processing method according to the embodiment, since the sprag LP is detected also using the crossing edge lines VL1 and VL2 which are less prone to be affected by obstructive objects 200, the sprag LP can be detected even in a case that the horizontal edge lines HL cannot be obtained properly. Furthermore, since the use of the horizontal edge lines HL2 and HL3 and the crossing edge lines VL1 and VL2 makes it easier to recognize the shape of the sprag LP, the probability of erroneous ranging that is caused by mistaking a top end line of the sprag LP as its bottom end line can be lowered. Thus, the image processing method according to the embodiment can determine a proper stop position.

In the following, the horizontal edge lines HL1-HL3 will be referred to as "horizontal edge lines HL" when they need not be discriminated from each other and the crossing edge lines VL1 and VL2 will be referred to as "crossing edge lines VL" when they need not be discriminated from each other.

Figure 2:
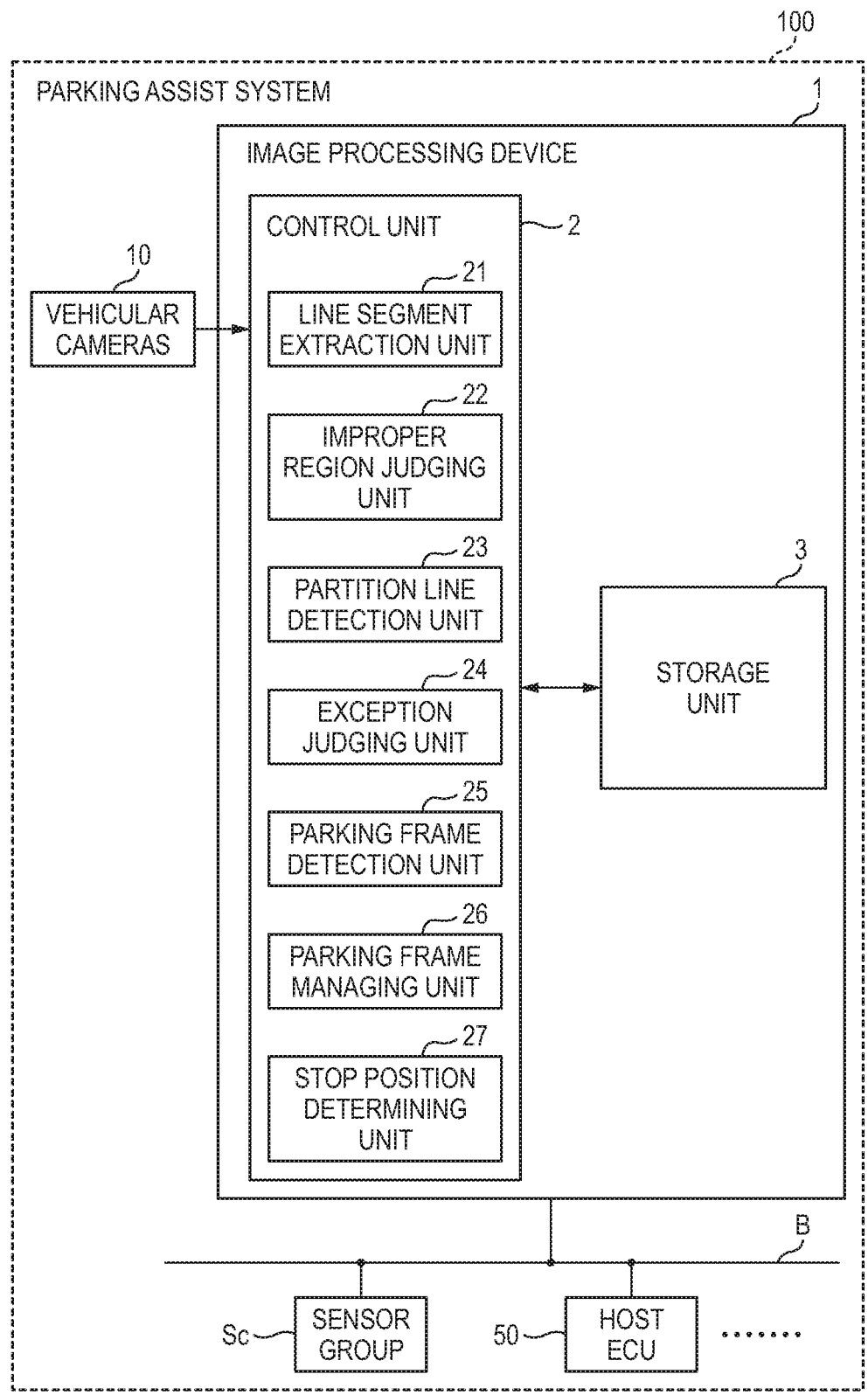
FIG. 2 is a functional block diagram showing an example configuration of an image processing apparatus according to the embodiment.

Next, an example configuration of the image processing device 1 according to the embodiment will be described with reference to FIG. 2. FIG. 2 is a functional block diagram of a parking assist system 100 including the image processing device 1 and shows an example configuration of the image processing device 1. As shown in FIG. 2, the parking assist system 100 is equipped with the image processing device 1, vehicular cameras 10, a sensor group Sc, and a host ECU (electronic control unit) 50. As shown in FIG. 2, the image processing device 1, the sensor group Sc, and the host ECU 50 can communicate with each other via a communication bus B which complies with the communication standard of CAN (Control Area Network) communication.

The sensor group Sc, which consists of various kinds of sensors for detecting a running state of the vehicle C, communicates detected sensor values to the image processing device 1. The sensor group Sc includes a vehicle speed sensor for detecting a rotation speed of wheels of the vehicle C, a steering angle sensor for detecting a steering angle of the vehicle C, etc.

The host ECU 50, which is, for example, a CPU for assisting automatic parking of the vehicle C, parks the vehicle C in a parking frame PS detected by the image processing device 1. Being, for example, an EPS (electric power steering)-ECU for controlling the steering angle of the vehicle C, the host ECU 50 can control the steering angle so that the vehicle C is parked in a parking frame PS detected by the image processing device 1. The host ECU 50 may include ECUs for accelerator control and braking control.

As shown in FIG. 2, the image processing device 1 is equipped with a control unit 2 and a storage unit 3. The control unit 2 is equipped with a line segment extraction unit 21, an improper region judging unit 22, a partition line detection unit 23, an exception judging unit 24, a parking frame detection unit 25, a parking frame managing unit 26, and a stop position determining unit 27.

For example, the control unit 2 includes a computer having a CPU (central processing unit), a ROM (read-only memory), a RAM (random access memory), an HDD (hard disk drive), an input/output port, etc., and other various kinds of circuits.

For example, the CPU of the computer functions as the line segment extraction unit 21, the improper region judging unit 22, the partition line detection unit 23, the exception judging unit 24, the parking frame detection unit 25, the parking frame managing unit 26, and the stop position determining unit 27 by reading out programs stored in the ROM and running them.

All or part of the line segment extraction unit 21, the improper region judging unit 22, the partition line detection unit 23, the exception judging unit 24, the parking frame detection unit 25, the parking frame managing unit 26, and the stop position determining unit 27 can be implemented as hardware such as an ASIC (application-specific integrated circuit) or an FPGA (field-programmable gate array).

For example, the storage unit 3 corresponds to the RAM and the HDD. The RAM and the HDD can store various kinds of information and the information of various kinds of programs. The image processing device 1 may be configured so as to acquire the various kinds of information and programs from a portable recording medium or another computer that is connected to it by wire or wirelessly via a network.

For example, the control unit 2 may execute a parking frame detection process and a stop position determining process (described later) either in the case where the vehicle C is considered to be running in a parking lot (e.g., the vehicle speed is lower than or equal to 30 km/h) or during all the period when the vehicle C is running.

The line segment extraction unit 21 extracts edge points on the basis of the luminance of each of pixels of an image I that is taken and input from a vehicular camera 10. More specifically, the line segment extraction unit 21 converts image data received from the vehicular camera 10 into a grayscale image. Grayscaling is processing of converting the value of each pixel of image data into one of prescribed gradation levels of white to black (e.g., 256 gradation levels) according to its luminance.

Then the line segment extraction unit 21 calculates edge intensity and a luminance gradient of each pixel by, for example, applying a Sobel filter to the grayscale image. The line segment extraction unit 21 thereafter extracts edge points by extracting pixels whose edge intensity values exceed a prescribed value. The line segment extraction unit 21 communicates edge information relating to the extracted edge points to the improper region judging unit 22.

The improper region judging unit 22 judges, on the basis of the edge points extracted by the line segment extraction unit 21, presence/absence of an improper region where detection of a partition line to constitute a parking frame PS is difficult. For example, the improper region judging unit 22 determines, as an improper region, an unpaved road surface region (e.g., graveled region) and a grating region where more edge points are detected than in a paved road surface.

More specifically, the improper region judging unit 22 can judge, as an improper region, a region where the density of edge points is higher than a prescribed value or the luminance gradient of edge points is not uniform. The improper region judging unit 22 eliminates edge information of the improper region from the above-mentioned edge information on the basis of the thus-determined improper region and gives resulting information to the downstream stage.

The partition line detection unit 23 detects partition line candidates, that is, candidates for partition lines to partition a parking frame PS, on the basis of the edge points extracted by the line segment extraction unit 21. More specifically, the partition line detection unit 23 detects, as a partition line candidate, two edge lines each of which is a connection of plural consecutive edge points if they are approximately parallel with each other and whose interval corresponds to the width of partition lines.

That is, the partition line detection unit 23 detects, as a partition line candidate, two edge lines to correspond to two respective end lines of each partition line. The partition line detection unit 23 generates partition line information relating to the detected partition line candidates and communicates the generated partition line information to the exception judging unit 24.

The partition line detection unit 23 can perform the processing of detecting partition line candidates in such a manner as to eliminate the improper region detected by the improper region judging unit 22. In other words, the partition line detection unit 23 does not perform the partition line candidate detection processing for the improper region. This makes it possible to reduce the processing load of the control unit 2.

The exception judging unit 24 judges presence/absence of a parking prohibition region where parking of the vehicle C is not permitted, on the basis of the partition line candidates detected by the partition line detection unit 23. For example, the exception judging unit 24 judges presence/absence of a parking prohibition region such as a zebra zone (vehicle guiding zone).

More specifically, where it is assumed that partition line candidates that approximately parallel with each other are partition lines (called "base partition lines"), the exception judging unit 24 judges that the region interposed between the base partition lines is a parking prohibition region (zebra zone) if three or more partition line candidates that are inclined with respect to the base partition lines exist at prescribed intervals.

The exception judging unit 24 can judge presence/absence of a partition line candidate(s) that is not necessary for detection of a parking frame PS, such as (part of) a road surface marking. For example, the exception judging unit 24 can detect a road surface marking contained in image data by matching partition line candidates detected by the partition line detection unit 23 with template models of road surface markings.

The exception judging unit 24 eliminates unnecessary partition line candidates from the partition line information, adds information indicating the parking prohibition region to the partition line information, and communicates the resulting partition line information to the parking frame detection unit 25.

The parking frame detection unit 25 detects a parking frame PS on the basis of the partition line candidates detected by the partition line detection unit 23. More specifically, the parking frame detection unit 25 detects, as part of a parking frame PS, two partition line candidates that are arranged parallel with each other in the horizontal direction (vehicle width direction) with a prescribed interval.

The prescribed interval is a width of a standard parking region for common or public use that is prescribed in, for example, a law relating to parking lots. At this time, the parking frame detection unit 25 detects a parking frame PS so as to exclude the parking prohibition region determined by the exception judging unit 24.

That is, the parking frame detection unit 25 detects a parking frame PS so as to exclude a zebra zone or the like. Upon detecting the parking frame PS, the parking frame detection unit 25 communicates parking frame information relating to the detected parking frame PS to the parking frame managing unit 26. In the following, the partition line candidates detected as constituting a parking frame PS will be referred to as "partition lines." Each piece of partition line information includes apex coordinates of each partition line with reference to the vehicle C.

The parking frame managing unit 26 manages, in time series, the partition frame information of the parking frame PS detected by the parking frame detection unit 25. The parking frame managing unit 26 can estimate a movement distance of the vehicle C on the basis of sensor values received from the sensor group Sc and estimate apex coordinates of current apex coordinates of each partition line on the basis of the movement distance and past partition frame information.

Furthermore, the parking frame managing unit 26 can update the coordinate information of each partition line of past partition frame information on the basis of newly received partition frame information. That is, the parking frame managing unit 26 updates the relative positional relationship between the vehicle C and the parking frame PS at such occasions as the vehicle C moves.

Still further, it is also possible for the parking frame managing unit 26 to set a detection range of a parking frame PS with an assumption that plural parking frames PS are arranged continuously. For example, the parking frame managing unit 26 assumes that plural parking frames PS exist continuously including one parking frame PS (reference parking frame) detected by the parking frame detection unit 25.

And the parking frame managing unit 26 sets the thus-assumed range of the plural parking frames PS as a detection range. With this measure, it suffices for the above-described line segment extraction unit 21 to perform edge line detection processing only for the detection range set by the parking frame managing unit 26, whereby the processing load of the control unit 2 can be reduced.

The stop position determining unit 27 determines a stop position of the vehicle C, that is, a parking position in the parking frame, on the basis of the edge points extracted by the line segment extraction unit 21. For example, the stop position determining unit 27 determines a stop position of the vehicle C by detecting a three-dimensional indication body such as a sprag(s) LP or a curb CB on the basis of the edge points extracted by the line segment extraction unit 21.

Figure 3:
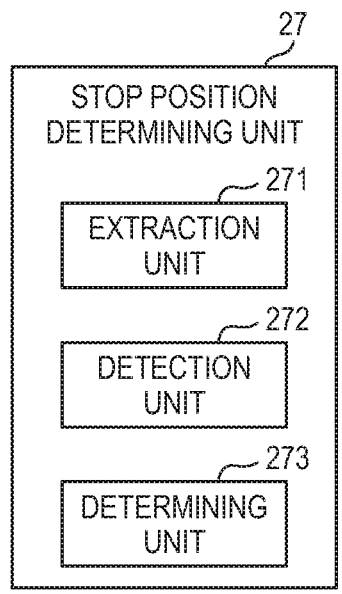
FIG. 3 is a functional block diagram showing an example configuration of a stop position determining unit.

Next, how the stop position determining unit 27 operates will be described in detail with reference to FIGS. 3-9. FIG. 3 is a functional block diagram showing the configuration of the stop position determining unit 27.

As shown in FIG. 3, the stop position determining unit 27 is equipped with an extraction unit 271, a detection unit 272, and a determining unit 273.

The extraction unit 271 extracts edge lines in each of which edge points are arranged consecutively in the horizontal direction from an image I taken that contains an image of a parking frame PS. More specifically, the extraction unit 271 extracts horizontal edge lines HL in each of which edge points are arranged consecutively in the horizontal direction and crossing edge lines VL in each of which edge points are arranged consecutively in a crossing direction that crosses the horizontal direction. Even more specifically, the extraction unit 271 extracts an edge line by connecting adjoining pixels in the case where pixels as edge points adjoin each other. In this case, the length of an edge line (i.e., edge length) can be expressed as the number of pixels.

Instead of extracting an edge line by connecting adjoining edge points (pixels), for example, the extraction unit 271 may form an edge line by connecting non-edge-point pixels on both sides of which edge points exist.

More specifically, when edge points are located on the two respective sides of non-edge-point pixels the number of which is smaller than a prescribed number, the extraction unit 271 extracts an edge line HL by connecting the non-edge-point pixels and the edge points located on both sides of them. With this measure, for example, non-edge-point pixels that were produced due to noise or the like from pixels that should have been extracted as edge points can be extracted as part of an edge line. That is, the influence of noise can be canceled out.

The shape of an extracted horizontal edge line HL varies depending on whether edge points are in an after-projection state or a before-projection state. For example, where edge points are in a state that they have been projected onto a road surface coordinate plane, the extraction unit 271 extracts a horizontal edge line HL that extends straightly in the horizontal direction (vehicle width direction). Where edge points are in a state that they have not been projected, that is, they remain in the same state as were extracted from an image I taken, the extraction unit 271 extracts a horizontal edge line HL having a shape that depends on the lens characteristic of the vehicular camera 10 used. More specifically, where the lens system of the vehicular camera 10 employs a fisheye lens, the extraction unit 271 extracts a horizontal edge line HL that is curved so as to be convex or concave in the vertical direction in the image I.

The same is true of the shape of an extracted crossing edge line VL. For example, where edge points are in a state that they have been projected onto the road surface coordinate plane, the extraction unit 271 extracts a crossing edge line VL that extends straightly in the vertical direction (vehicle length direction). Where edge points are in a state that they have not been projected, that is, they remain in the same state as were extracted from the image I taken, the extraction unit 271 extracts a crossing edge line VL having a shape that depends on the lens characteristic of the vehicular camera 10 used. More specifically, where the lens system of the vehicular camera 10 employs a fisheye lens, the extraction unit 271 extracts a crossing edge line VL that is curved so as to be convex or concave in the vehicle width direction in the image I. The extraction unit 271 acquires images I consecutively in time-series order, extracts horizontal edge lines HL and crossing edge lines VL from each of the time-series images I, and outputs the extracted horizontal edge lines HL and crossing edge lines VL to the detection unit 272 sequentially.

The detection unit 272 detects a three-dimensional indication body to be used as an indication body indicating a stop position in the parking frame PS on the basis of the horizontal edge lines HL and the crossing edge lines VL extracted by the extraction unit 271. For example, the detection unit 272 detects a three-dimensional indication body if the length, number, and arrangement of each set of the extracted horizontal edge lines HL and the extracted crossing edge lines VL coincide with those of any of prescribed three-dimensional indication body patterns.

More specifically, first, the detection unit 272 sets, as a three-dimensional indication body search region, a deep-side region of the parking frame PS detected by the parking frame detection unit 25. More specifically, the detection unit 272 sets, as a search region, a deep-side end region of the parking frame PS. This is because a three-dimensional indication body such as a sprag LP or a curb CB is disposed on the deep side in the parking frame PS. This makes it possible to lower the processing load of the control unit 2.

Alternatively, the detection unit 272 may set the entire image I as a search region, in which case a failure of detecting a three-dimensional indication body can be avoided.

After setting the search region, the detection unit 272 detects a curb CB on the basis of the horizontal edge lines HL or detects a sprag(s) LP on the basis of the horizontal edge lines HL and the crossing edge lines VL. In the following, a curb CB detection method will be described with reference to FIGS. 4-8 and a sprag LP detection method will be described with reference to FIG. 9.

FIGS. 4-8 illustrate the curb CB detection method. The detection unit 272 detects a single horizontal edge line HL whose edge length is longer than or equal to a prescribed threshold value from the plural horizontal edge lines HL extracted by the extraction unit 271, and detects a boundary line BD on the basis of the detected single horizontal edge line HL. That is, the detection unit 272 detects the bottom end line of a curb CB on the basis of a single horizontal edge line HL corresponding to a top end line of the curb CB.

Figure 4:
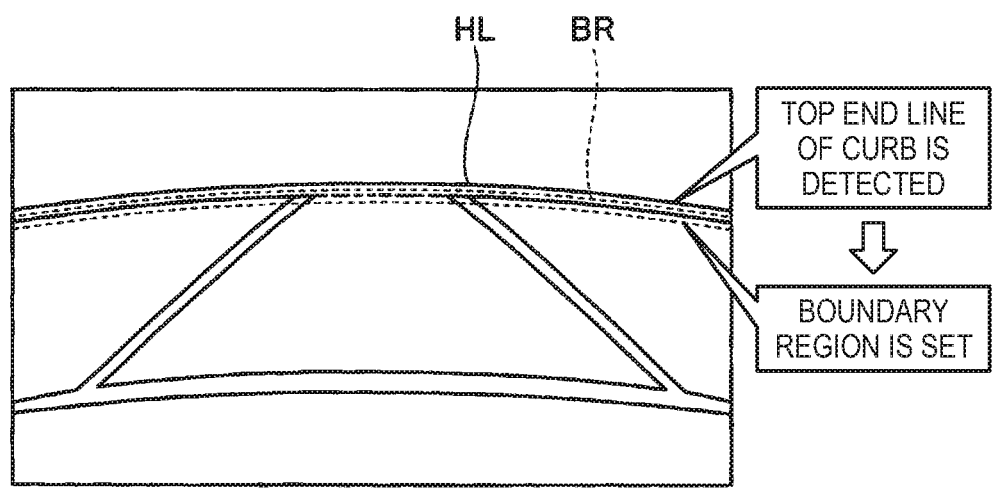
FIG. 4 is a first diagram illustrating a curb detection method.

More specifically, as shown in FIG. 4, first, the detection unit 272 detects a single horizontal edge line HL whose edge length is longer than or equal to the prescribed threshold value. For example, the threshold value corresponds to the length of the parking frame PS in the vehicle width direction.

Then the detection unit 272 sets, as a boundary region BR, a region that is considered to correspond to the bottom end line of the curb CB assuming that the detected single horizontal edge line HL corresponds to a top end line of the curb CB. More specifically, the detection unit 272 sets a boundary region BR under, in the vertical direction, the horizontal edge line HL assumed to correspond to a top end line of the curb CB.

If two single horizontal edge lines HL whose edge lengths are longer than or equal to the prescribed threshold value and that are arranged parallel with each other in the vertical direction are detected, the detection unit 272 does not set a boundary region BR and detects these two single horizontal edge lines HL as corresponding to a curb CB. More specifically, the detection unit 272 detects the upper one of the two single horizontal edge lines HL as corresponding to a top end line of a curb CB and detects the lower one as corresponding to the bottom end line of the curb CB, that is, as a boundary line BD.

Boundary region BR setting processing will now be described with reference to FIG. 5. For the sake of convenience, FIG. 5 shows only a horizontal edge line HL and a boundary region BR.

Figure 5:
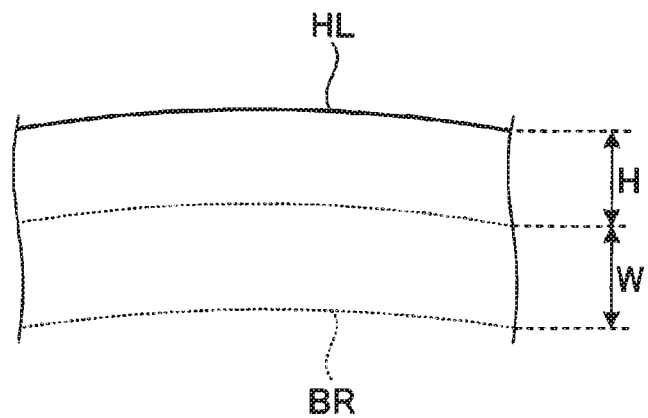
FIG. 5 is a second diagram illustrating the curb detection method.

As shown in FIG. 5, the boundary region BR is set under the horizontal edge line HL in the vertical direction so as to be distant from the horizontal edge line HL by a prescribed distance H and to be curbed parallel with the horizontal edge line HL. The distance H is set at, for example, a value that is determined on the basis of an actually measured height of the curb CB. That is, it is preferable that the distance H be set so that the boundary region BR is set at a position that would correspond to the position of the bottom end line of the curb CB.

Then, as shown in FIG. 5, the detection unit 272 sets a height W of the boundary region BR. The height W may be set either at a desired value or a value indicating a distribution range that is obtained by measuring the height of an actually installed curb CB at its plural positions.

Although in FIGS. 4 and 5 the boundary region BR is set under the horizontal edge line HL in the vertical direction, it may be set over the horizontal edge line HL in the vertical direction. In this case, a top end line of the curb CB can still be detected even if the top end line of the curb CB was not be detected because of presence of obstructive objects 200 or the like and only its bottom end line was detected. Thus, the accuracy of detection of a curb CB can be increased.

After setting the boundary region BR, the detection unit 272 judges whether a series edge line EL in which plural horizontal edge lines HL are arranged in the horizontal direction like a broken line exists in the boundary region BR. A method for detecting a series edge line EL will be described below with reference to FIG. 6.

Figure 6:
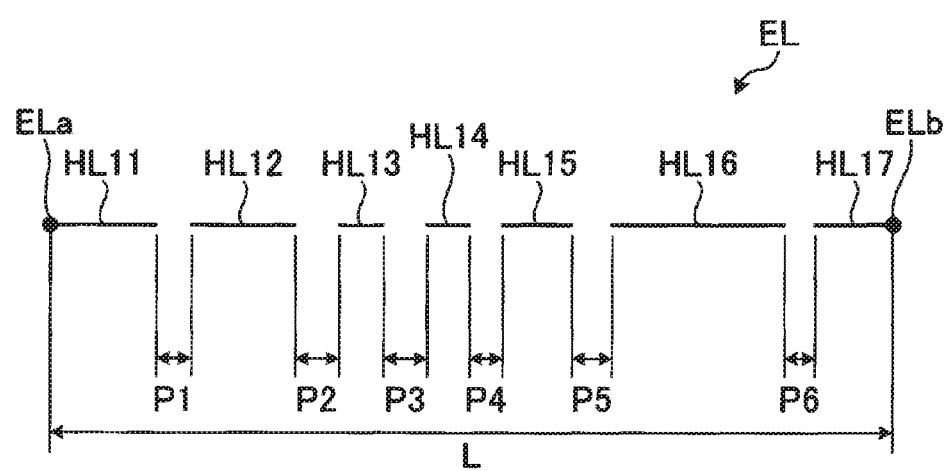
FIG. 6 is a third diagram illustrating the curb detection method.

A case that plural horizontal edge lines HL11-HL17 exist in the boundary region BR will be described with reference to FIG. 6. For the sake of convenience, in FIG. 6 the plural horizontal edge lines HL11-HL17 are shown as if to be arranged on a straight line.

First, the detection unit 272 judges whether the plural horizontal edge lines HL11-HL17 satisfy a series condition that they should satisfy to be a series edge line EL. For example, intervals P1-P6 between the plural horizontal edge lines HL11-HL17 are each shorter than a prescribed length, the detection unit 272 groups the plural horizontal edge lines HL11-HL17 into a series edge line EL.

If the edge length L of the series edge line EL is longer than or equal to a prescribed threshold value, the detection unit 272 detects the series edge line EL as corresponding to the bottom end line of the curb CB, that is, a deep-side boundary line BD of the parking frame PS.

The edge length L is the distance from one end ELa of the series edge line EL to its other end ELb and, more specifically, is the sum of the edge lengths of the plural horizontal edge lines HL11-HL17 and the intervals P1-P6 between the plural horizontal edge lines HL11-HL17. Alternatively, the edge length L may be made the sum of the edge lengths of the plural horizontal edge lines HL11-HL17. For example, the two ends Ela and ELb of the series edge line EL are intersecting points of the series edge line EL and the longitudinal partition lines Ls.

Then the detection unit 272 sets a final bottom end position of the curb CB on the basis of the selected series edge line EL. The determining unit 273 (described later) determines a final stop position using the bottom end position set by the detection unit 272.

Figure 7:
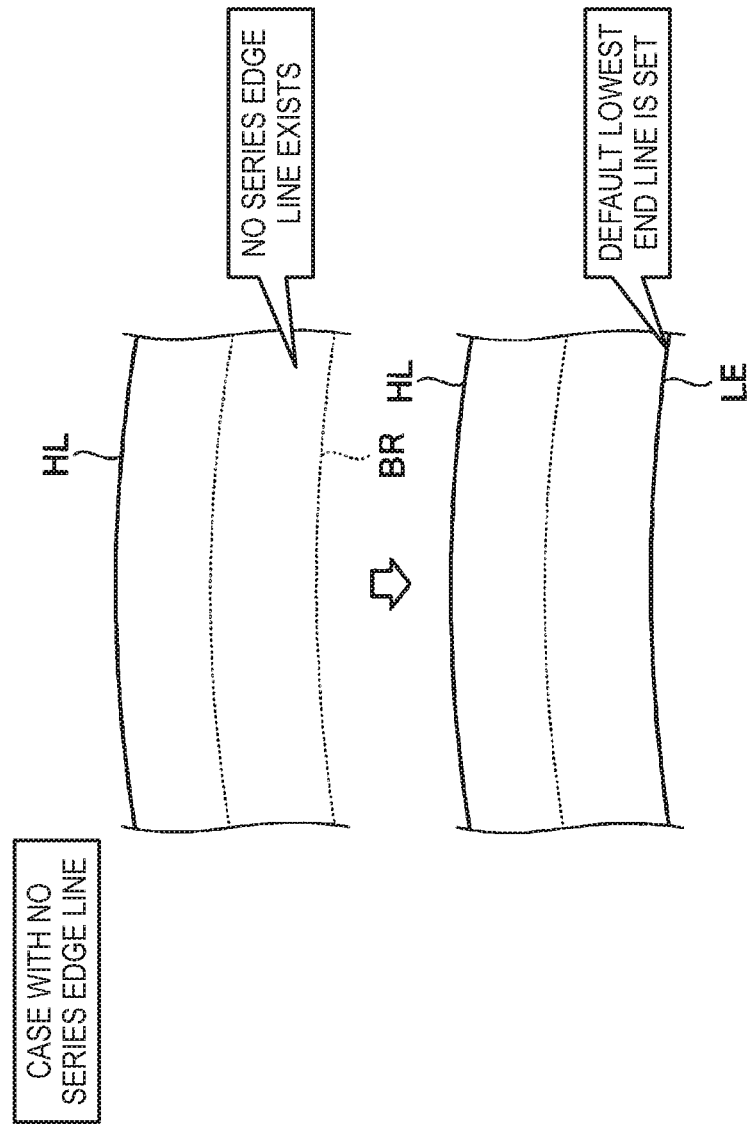
FIG. 7 is a fourth diagram illustrating the curb detection method.
Figure 8:
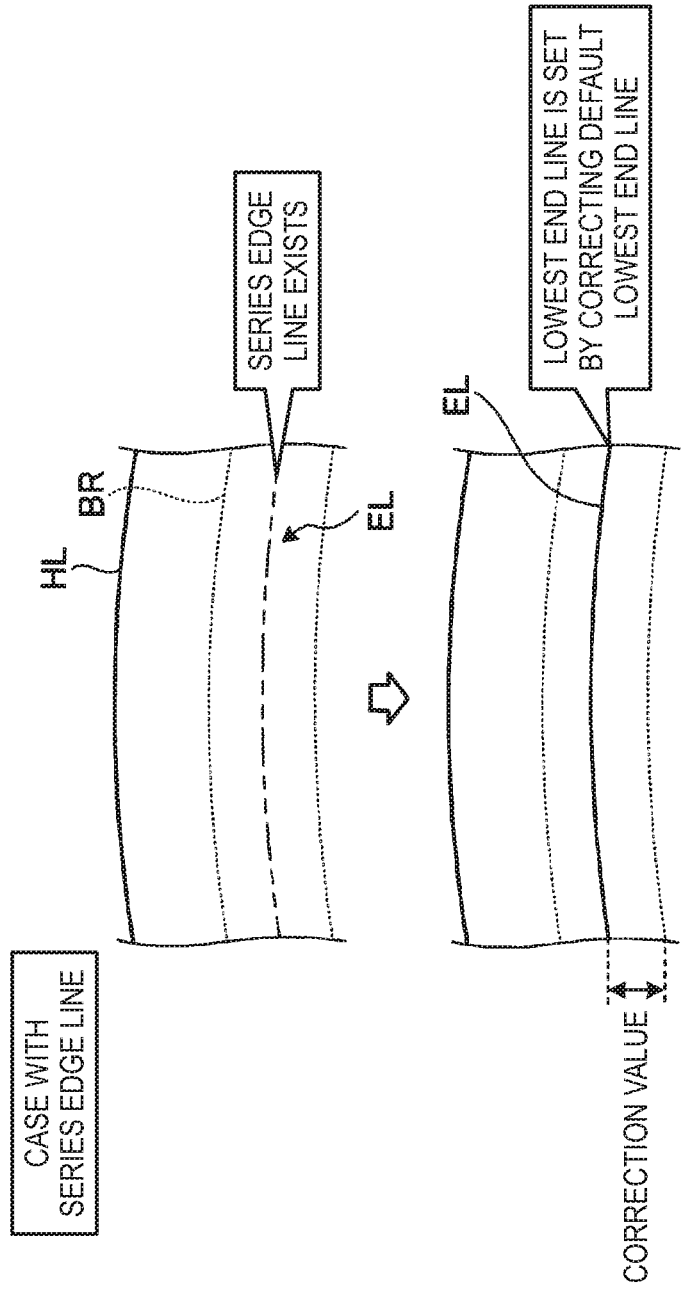
FIG. 8 is a fifth diagram illustrating the curb detection method.

Bottom end position setting processing that is performed by the detection unit 272 will now be described with reference to FIGS. 7 and 8. FIG. 7 illustrates bottom end position setting processing to be performed when no series edge line EL exists in the boundary region BR, and FIG. 8 illustrates bottom end position setting processing to be performed when a series edge line EL exists in the boundary region BR.

As shown in FIG. 7, where no series edge line EL exists in the boundary region BR, there are three possibilities, that is, a possibility that the horizontal edge line HL corresponds to the bottom end line of the curb CB, a possibility that the horizontal edge line HL corresponds to the bottom end line of a wall of a relatively tall wall (i.e., the image I taken does not contain a line corresponding to the top end line of the wall), and a possibility that no series edge line EL is detected because the entire bottom end line of the curb CB is covered with obstructive objects 200.

Considering the possibility that the entire bottom end line of the curb CB is covered with obstructive objects 200, the detection unit 272 sets a lowest end line LE imaginarily in the boundary region BR. More specifically, the detection unit 272 sets a default lowest end line LE at the bottom end of the boundary region BR. As a result, even if a series edge line EL is not detected because the entire bottom end line of the curb CB is covered with obstructive objects 200, the determining unit 273 (described later) can determine a proper stop position by measuring a distance to the default lowest end line LE. An event that the vehicle C goes up onto the curb CB or comes into contact with a wall can thus be prevented.

The default lowest end line LE may be set at any position other than the bottom end of the boundary region BR, even outside the boundary region BR.

On the other hand, where as shown in FIG. 8 a series edge line EL exists in the boundary region BR, the probability that the series edge line EL corresponds to the bottom end line of the curb CB is relatively high. Thus, the detection unit 272 sets a lowest end line LE on the basis of the position of the series edge line EL.

For example, as shown in FIG. 8, the detection unit 272 sets a final lowest end line LE by correcting the above-mentioned default series edge line LE (see FIG. 7) using a correction value that is based on the position of the series edge line EL. More specifically, the detection unit 272 corrects the default series edge line LE using a correction value that causes the final lowest end line LE to be located at the position of the series edge line EL.

Although in the example of FIG. 8 using a correction value that causes the final lowest end line LE to be located at the position of the series edge line EL, any correction value may be employed as long as it causes the final lowest end line LE to be located between the series edge line EL and the default series edge line LE.

Since as describe above a boundary region BR is set under a single horizontal edge line HL and a series edge line EL existing in the boundary region BR is detected as corresponding to the bottom end line of the curb CB, that is, the boundary line BR of the parking frame PS, the region other than the boundary region BR can be excluded from a processing target region. As a result, the processing load of the control unit 2 can be lowered and, since the processing target region is narrowed down to the boundary region BR, the accuracy of detection of a series edge line EL can be increased.

The detection unit 272 can detect a sprag LP disposed in the parking frame PS if the horizontal edge lines HL and the crossing edge lines VL satisfy prescribed detection conditions, which include, for example, the numbers, manners of arrangement, crossing angles, etc. of horizontal edge lines HL and crossing edge lines VL.

The detection unit 272 detects a sprag LP if two horizontal edge lines HL and two crossing edge lines VL form an approximately rectangular shape. More specifically, the detection unit 272 detects a sprag LP if two crossing edge lines VL are perpendicular to each of two parallel horizontal edge lines HL at its two respective ends. The detection unit 272 may detect a sprag LP if at least one crossing edge line VL is extracted. That is, if the detection unit 272 detects plural (e.g., two) horizontal edge lines HL and a single crossing edge line VL as corresponding to a sprag LP if the single crossing edge line VL is perpendicular to the plural horizontal edge lines HL at their ends.

Detecting a manner of arrangement of horizontal edge lines HL and crossing edge lines VL paying attention to the shape of a sprag LP of a block type or the like in the above-described manner makes it possible increase the accuracy of detection of a sprag LP.

Furthermore, the detection unit 272 may perform sprag LP detection processing taking temporal continuity into consideration. More specifically, when horizontal edge lines HL and crossing edge lines VL that satisfy the above-mentioned detection conditions have been extracted consecutively in time series, the detection unit 272 detect the horizontal edge lines HL and the crossing edge lines VL as corresponding to a sprag LP. If horizontal edge lines HL and crossing edge lines VL that satisfy the above-mentioned detection conditions are not extracted in time-series, the detection unit 272 detects the series of horizontal edge lines HL and series edge line EL as road surface noise.

Detection processing that is performed by the detection unit 272 utilizing temporal continuity will now be described with reference to FIG. 9. FIG. 9 illustrates sprag LP detection processing that utilizes temporal continuity. It is assumed that an image I taken shown in FIG. 9 contains a road surface pattern 300 which extends in the horizontal direction so as to include sprags LP.

For example, as shown in the top part of FIG. 9, there may occur a case that the extraction unit 271 extracts horizontal edge lines HL and crossing edge lines VL are extracted from an image I taken from the vehicle C that is relatively distant from a parking frame PS and also extracts horizontal edge lines HL that are similar in length to sprags LP from a road surface pattern 300.

As shown in the bottom part of FIG. 9, horizontal edge lines HL obtained from a road surface pattern 300 of an image I taken in a state that the vehicle C is closer to the parking frame PS are different from those shown in the top part of FIG. 9 in the lengths, arrangement, number, etc. of edges. That is, horizontal edge lines HL that are obtained from an object, such as the road surface pattern 300, whose actual boundary is not clear has no or very unstable temporal continuity.

In view of the above, the detection unit 272 uses, as targets of sprag LP detection processing, only horizontal edge lines HL and crossing edge lines VL that are stable in temporal continuity. By virtue of this measure, horizontal edge lines HL and crossing edge lines VL that originate from road surface noise such as the road surface pattern 300 can be eliminated, whereby sprags LP can be detected with high accuracy. Furthermore, since only horizontal edge lines HL and crossing edge lines VL that are stable in temporal continuity are used as targets of sprag LP detection processing, it is not necessary to perform detection processing on unnecessary edge lines, whereby the processing load of the control unit 2 can be lowered.

When detecting a sprag LP, the detection unit 272 presumes a position of its bottom end line regarding a certain horizontal edge line HL as a top end line of the sprag LP. Then the detection unit 272 communicates the detected position of the bottom end line of the detected three-dimensional indication body such as a curb CB or a sprag LP to the determining unit 273.

The determining unit 273 determines a stop position in the parking frame PS on the basis of the three-dimensional indication body detected by the detection unit 272. For example, the determining unit 273 determines a stop position in the parking frame PS on the basis of the position of the bottom end line of the curb CB detected by the detection unit 272. More specifically, the determining unit 273 determines a stop position so that the rear end of the vehicle C will be located just in front of the bottom end line of the curb CB.

The determining unit 273 determines a stop position in the parking frame PS on the basis of the position of the bottom end line of the sprag LP detected by the detection unit 272. More specifically, the determining unit 273 determines a stop position so that the bottom portion of the rear wheel of the vehicle C will be located just in front of the bottom end line of the sprag LP.

Figure 10:
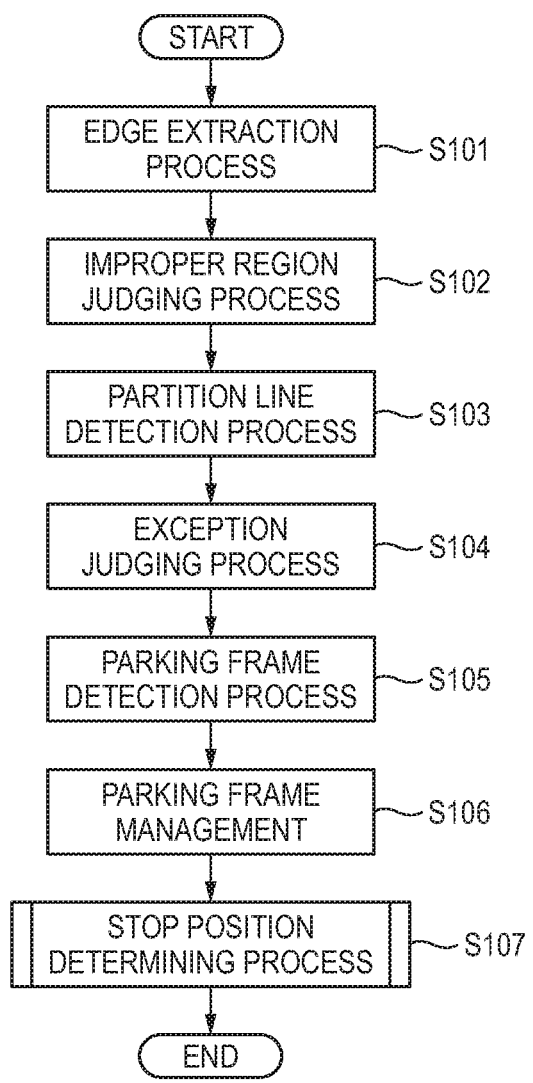
FIG. 10 is a flowchart showing the procedure of the overall process that is executed by the image processing device according to the embodiment.

Next, the procedure of a process that is executed by the image processing device 1 according to the embodiment will be described with reference to FIGS. 10-13. FIG. 10 is a flowchart showing the procedure of the overall process that is executed by the image processing device 1. For example, this overall process is executed by the control unit 2 repeatedly while the vehicle speed of the vehicle C is lower than or equal to a prescribed value (e.g., 30 km/h).

As shown in FIG. 10, first, at step S101, the image processing device 1 executes an edge extraction process of extracting edge points from a grayscale image. At step S102, the image processing device 1 executes an improper region judging process on the basis of processing results of the edge extraction process.

At step S103, the image processing device 1 executes a partition line detection process of detecting partition line candidates on the basis of the edge points extracted at step S101.

At step S104, the image processing device 1 executes an exception judging process of judging presence/absence of a parking prohibition region or the like on the basis of the processing results of steps S101-S103. At step S105, the image processing device 1 executes a parking frame detection process of detecting a parking frame PS.

At step S106, the image processing device 1 performs parking frame management of managing the parking frame PS detected at step S105. At step S107, the image processing device 1 executes a stop position determining process of determining a stop position, where to stop the vehicle C, in the parking frame PS. Then the image processing device 1 finishes the execution of the process shown in FIG. 10.

Figure 11:
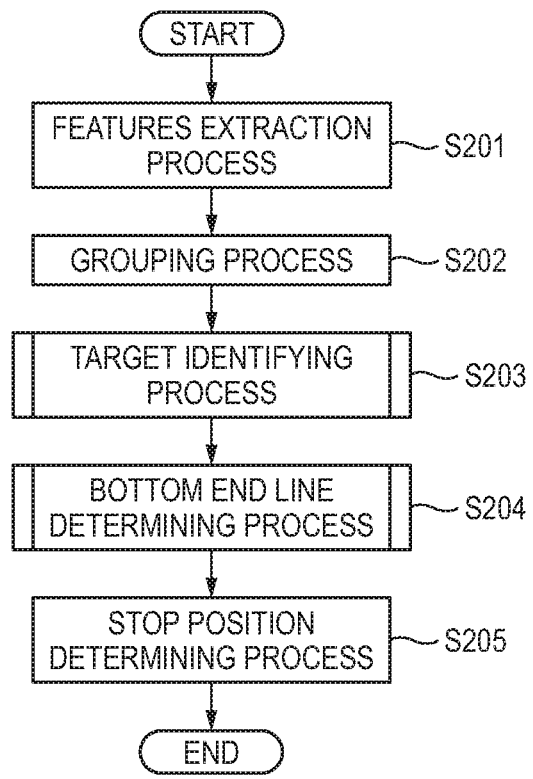
FIG. 11 is a flowchart showing the procedure of the whole of a stop position determining process that is executed by the image processing device.

Next, the procedure of the above-described stop position determining process (step S107) shown in FIG. 10 will be described in detail. FIG. 11 is a flowchart showing the procedure of the overall stop position determining process shown in FIG. 10 which is executed by the image processing device 1.

As shown in FIG. 11, at step S201, the stop position determining unit 27 executes a features extraction process of extracting horizontal edge lines HL in each of which edge points extracted by the edge extraction process (step S101) are arranged consecutively in the horizontal direction and crossing edge lines VL in each of which edge points are arranged consecutively in a crossing direction that crosses the horizontal direction.

At step S202, the stop position determining unit 27 executes a grouping process of grouping the extracted horizontal edge lines HL and crossing edge lines VL according to prescribed conditions. For example, the grouping process is a process of grouping plural horizontal edge lines HL corresponding to a series edge line EL and grouping horizontal edge lines HL and crossing edge lines VL corresponding to a sprag LP.

At step S203, the stop position determining unit 27 executes a target identifying process of recognizing presence/absence, a type, etc. of a target three-dimensional indication body. A detailed procedure of the target identifying process will be described later with reference to FIG. 12.

At step S204, the stop position determining unit 27 executes a bottom end line determining process of determining (a position of) the bottom end line of a three-dimensional indication body on the basis of processing results of the target identifying process. A detailed procedure of the bottom end line determining process will be described later with reference to FIG. 13.

At step S205, the stop position determining unit 27 executes a stop position determining process of determining a stop position in a parking frame PS on the basis of the position of the bottom end line of the three-dimensional indication body determined by the bottom end line determining process.

Figure 12:
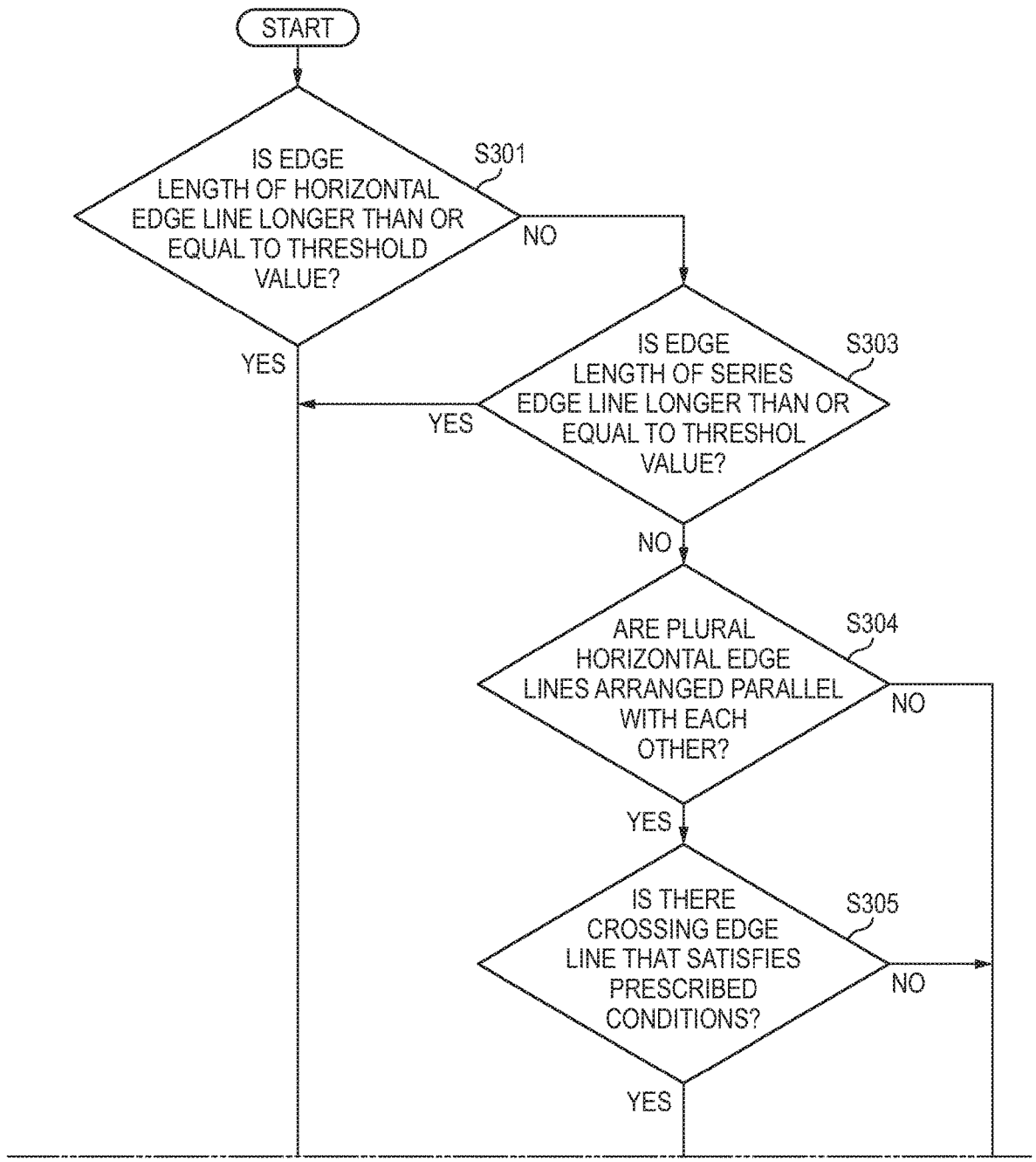
FIG. 12 is a flowchart showing the procedure of a target identifying process which is executed by the image processing device.

Next, the procedure of the above-described target identifying process (step S203) shown in FIG. 11 will be described in detail. FIG. 12 is a flowchart showing the procedure of the target identifying process which is executed by the image processing device 1.

As shown in FIG. 12, at step S301, the stop position determining unit 27 judges whether the edge length of a single horizontal edge line HL extracted by the features extraction process is longer than or equal to a prescribed threshold value.

If the edge length of the single horizontal edge line HL is longer than or equal to the prescribed threshold value (S301: yes), at step S302 the stop position determining unit 27 detects a stop position indication body such as a curb CB in the parking frame PS, that is a three-dimensional indication body that defines a deep-side boundary BD of the parking frame PS.

If the edge length of the single horizontal edge line HL is shorter than the prescribed threshold value (S301: no), at step S303 the stop position determining unit 27 judges whether the edge length of a series horizontal edge line HL in which plural horizontal edge lines HL are arranged like a broken line is longer than or equal to the prescribed threshold value.

If the edge length of a series horizontal edge line HL is longer than or equal to the prescribed threshold value (step S303: yes), the stop position determining unit 27 executes step S302. If the edge length of a series horizontal edge line HL is shorter than the prescribed threshold value (step S303: no), at step S304 the stop position determining unit 27 judges whether plural horizontal edge lines HL are arranged parallel with each other in the vertical direction.

If judging that plural horizontal edge lines HL are arranged parallel with each other in the vertical direction (S304: yes), at step S305 the stop position determining unit 27 judges whether there exists a crossing edge line VL that satisfies prescribed conditions.

If judging that there exists a crossing edge line VL that satisfies the prescribed conditions (S305: yes), at step S306 the stop position determining unit 27 judges whether the plural horizontal edge lines HL and the crossing edge line VL were extracted consecutively in time series.

If judging that the plural horizontal edge lines HL and the crossing edge line VL were detected consecutively in time series (S306: yes), at step S307 the stop position determining unit 27 detects them as corresponding to a sprag LP. Then the stop position determining unit 27 finishes the execution of the process.

On the other hand, if judging that plural horizontal edge lines HL are not arranged parallel with each other in the vertical direction (S304: no), at step S308 the stop position determining unit 27 detects the horizontal edge lines HL concerned as road surface noise. Then the stop position determining unit 27 finishes the execution of the process.

If judging that there exists no crossing edge line VL that satisfies the prescribed conditions (S305: no), the stop position determining unit 27 executes step S308.

If judging that the plural horizontal edge lines HL and the crossing edge line VL were not detected consecutively in time series (S306: no), the stop position determining unit 27 executes step S308.

Figure 13:
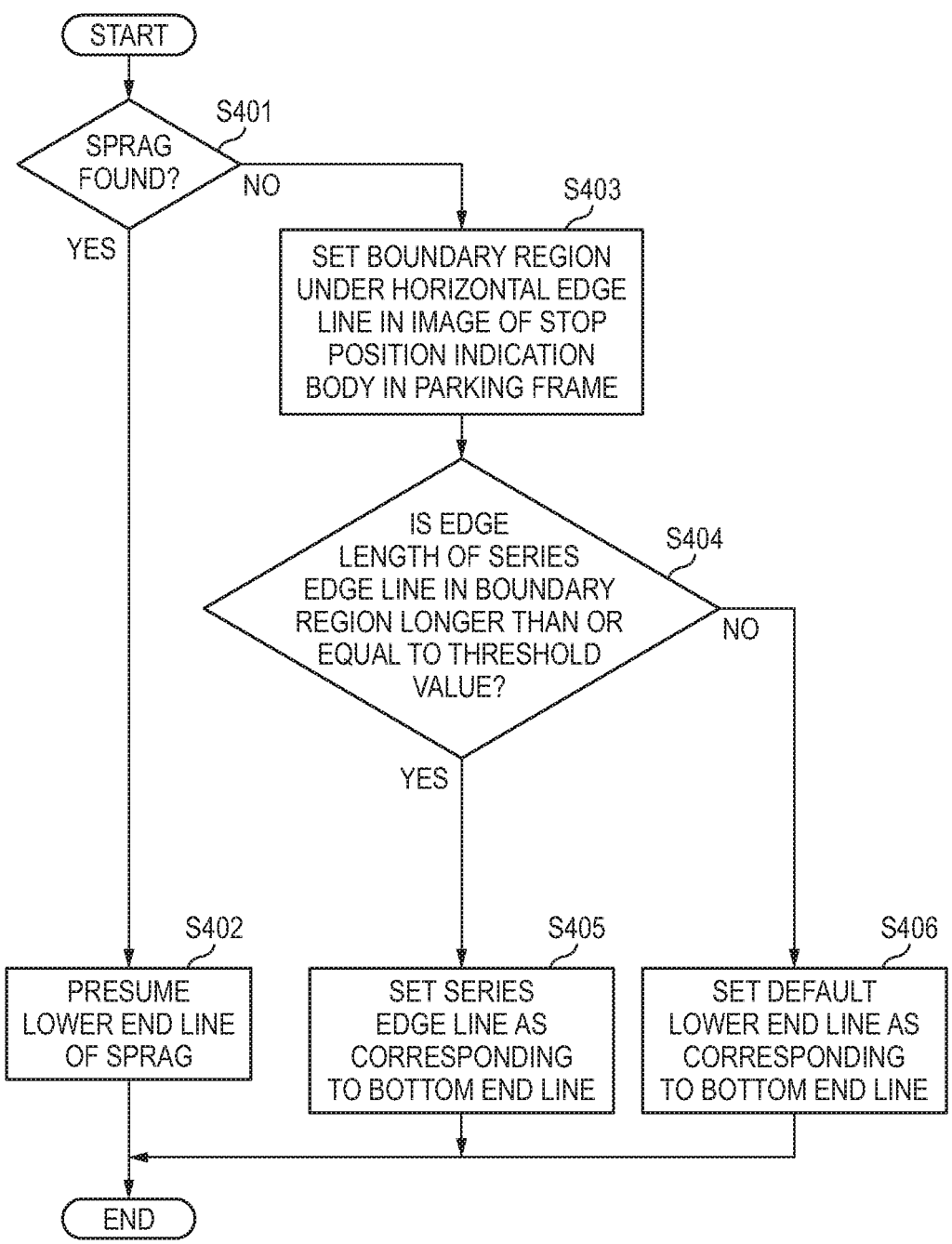
FIG. 13 is a flowchart showing the procedure of a bottom end line determining process which is executed by the image processing device.

Next, the procedure of the above-described bottom end line determining process (step S204) shown in FIG. 11 will be described in detail. FIG. 13 is a flowchart showing the procedure of the bottom end line determining process shown in FIG. 11 which is executed by the image processing device 1.

As shown in FIG. 13, at step S401 the stop position determining unit 27 judges, on the basis of the result of the target identifying process, whether a sprag LP exists in the parking frame PS. If a sprag LP exists (S401: yes), at step S402 the stop position determining unit 27 presumes (a position of) the bottom end line of the sprag LP. Then the stop position determining unit 27 finishes the execution of the process.

On the other hand, if no sprag LP exists in the parking frame PS (S401: no), at step S403 the stop position determining unit 27 sets a boundary region BR under the horizontal edge line HL in an image of the stop position indication body in the parking frame PS.

At step S404, the stop position determining unit 27 judges whether the edge length of a series edge line EL is longer than or equal to a prescribed threshold value. If the edge length of a series edge line EL is longer than or equal to the prescribed threshold value (S404: yes), at step S405 the stop position determining unit 27 sets the series edge line EL as corresponding to the bottom end line of a curb CB. Then the stop position determining unit 27 finishes the execution of the process.

On the other hand, if the edge length of a series edge line EL is shorter than the prescribed threshold value (S404: no), at step S406 the stop position determining unit 27 sets a default lower end line as corresponding to the bottom end line of a curb CB. Then the stop position determining unit 27 finishes the execution of the process.

As described above, the stop position determining unit 27 of the image processing device 1 according to the embodiment is equipped with the extraction unit 271, the detection unit 272, and the determining unit 273. The extraction unit 271 extracts a horizontal edge line HL in which edge points are arranged consecutively in the horizontal direction from an image I taken that contains an image of a parking frame PS. The detection unit 272 detects the series edge line as corresponding to a deep-side boundary line BD of the parking frame PS if an edge length of a series edge line in which plural horizontal edge lines HL are arranged in the horizontal direction like a broken line is longer than or equal to a prescribed threshold value among plural horizontal edge lines HL extracted by the extraction unit 271. The determining unit 273 determines a stop position in the parking frame PS on the basis of the boundary line BD detected by the detection unit 272. The image processing device 1 thus configured can determine a proper stop position.

Those skilled in the art could derive further advantages and modifications easily. Thus, broader modes of the invention are not limited to the particular and typical detailed embodiment described above. Various modifications are therefore possible without departing from the spirit and scope of the comprehensive inventive concept that is defined by the accompanying claims and its equivalents.

LIST OF REFERENCE SYMBOLS

1: Image processing device
2: Control unit
3: Storage unit
10: Vehicular camera
21: Line segment extraction unit
22: Improper region judging unit
23: Partition line detection unit
24: Exception judging unit
25: Parking frame detection unit
26: Parking frame managing unit
27: Stop position determining unit
50: Host ECU
100: Parking assist system
200: Obstructive object
271: Extraction unit
272: Detection unit
273: Determining unit
C: Vehicle
HL: Horizontal edge line
VL: Crossing edge line
I: Image taken

What is claimed is:

1. An image processing device comprising:
a computer including a hardware processor configured to function as an extraction unit, a detection unit and a determining unit, wherein
the extraction unit extracts a horizontal edge line in which edge points are arranged consecutively in a horizontal direction from a taken image that contains an image of a parking frame;
the detection unit detects, when an edge length of a series edge line in which a plurality of the horizontal edge lines are arranged in the horizontal direction like a broken line is longer than or equal to a prescribed threshold value among a plurality of the horizontal edge lines extracted by the extraction unit, the series edge line as corresponding to a deep-side boundary line of the parking frame;
the determining unit determines a stop position in the parking frame based on the deep-side boundary line detected by the detection unit;
the detection unit detects the horizontal edge line which is a single line having an edge length that is longer than or equal to the prescribed threshold value to be the deep-side boundary line based on the single horizontal edge line; and
the detection unit detects, as a boundary region, a region that is located under the single horizontal edge line and detects the series edge line included in the boundary region as corresponding to the deep-side boundary line.

2. An image processing device comprising:
a computer including a hardware processor configured to function as an extraction unit, a detection unit and a determining unit, wherein
the extraction unit extracts, from a taken image that contains an image of a parking frame, a horizontal edge line in which edge points are arranged consecutively in a horizontal direction and a crossing edge line in which edge points are arranged consecutively in a crossing direction that crosses the horizontal direction;
the detection unit detects the horizontal edge line and the crossing edge line extracted by the extraction unit as corresponding to a sprag disposed in the parking frame when the horizontal edge line and the crossing edge line extracted by the extraction unit satisfy a prescribed detection condition;
the determining unit determines a stop position in the parking frame based on the sprag detected by the detection unit; and
when the crossing edge line is a single line that is perpendicular to a plurality of the horizontal edge lines at ends thereof, the detection unit detects the plurality of the horizontal edge lines and the single crossing edge line as corresponding to the sprag.

3. The image processing device according to claim 2, wherein:
the extraction unit extracts the horizontal edge line and the crossing edge line from each of a plurality of the images taken that are received in time series; and
in a case where the horizontal edge lines and the crossing edge lines that satisfy the prescribed detection condition are extracted consecutively in time series, the detection unit detects the horizontal edge lines and the crossing edge lines as corresponding to the sprag.

4. An image processing method comprising:
extracting, by a computer having a hardware processor, a horizontal edge line in which edge points are arranged consecutively in a horizontal direction from a taken image that contains an image of a parking frame;
when an edge length of a series edge line in which a plurality of the horizontal edge lines are arranged in the horizontal direction like a broken line is longer than or equal to a prescribed threshold value among a plurality of the extracted horizontal edge lines, detecting, by the computer having the hardware processor, the series edge line as corresponding to a deep-side boundary line of the parking frame;
determining, by the computer having the hardware processor, a stop position in the parking frame based on the detected deep-side boundary line;
the detecting includes detecting the horizontal edge line which is a single line having an edge length that is longer than or equal to the prescribed threshold value to be the deep-side boundary line based on the single horizontal edge line; and
the detecting includes detecting, as a boundary region, a region that is located under the single horizontal edge line and detecting the series edge line included in the boundary region as corresponding to the deep-side boundary line.

5. An image processing method comprising:
extracting, by a computer having a hardware processor, from a taken image that contains an image of a parking frame, a horizontal edge line in which edge points are arranged consecutively in a horizontal direction and a crossing edge line in which edge points are arranged consecutively in a crossing direction that crosses the horizontal direction;

detecting, by the computer having the hardware processor, the extracted horizontal edge line and the extracted crossing edge line as corresponding to a sprag disposed in the parking frame when the extracted horizontal edge line and the extracted crossing edge line satisfy a prescribed detection condition;

determining, by the computer having the hardware processor, a stop position in the parking frame based on the detected sprag; and when the crossing edge line is a single line that is perpendicular to a plurality of the horizontal edge lines at ends thereof, the detecting includes detecting the plurality of the horizontal edge lines and the single crossing edge line as corresponding to the sprag.

* * * * *